United States Patent [19]

Vest et al.

[11] 4,386,524
[45] Jun. 7, 1983

[54] MANOMETER TYPE APPARATUS WITH IMPROVEMENT

[75] Inventors: Eugene W. Vest, Wappingers Falls; Dean C. McGahey, Fishkill, both of N.Y.

[73] Assignee: Texaco Inc., White Plains, N.Y.

[21] Appl. No.: 238,186

[22] Filed: Feb. 25, 1981

[51] Int. Cl.³ ............................................. G01F 23/14
[52] U.S. Cl. ........................................ 73/299; 73/747
[58] Field of Search ........................... 73/299, 747, 73; 116/227

[56] References Cited

U.S. PATENT DOCUMENTS

| | | | |
|---|---|---|---|
| 1,999,272 | 4/1935 | Austin | 116/227 |
| 3,173,298 | 3/1965 | Gilmont | 73/747 |
| 3,374,324 | 3/1968 | McGrann | 73/73 |
| 4,182,178 | 1/1980 | Nolte | 73/299 |

*Primary Examiner*—Donald O. Woodiel
*Attorney, Agent, or Firm*—Carl G. Ries; Robert A. Kulason; Henry C. Dearborn

[57] ABSTRACT

A manometer type instrument with an open leg above an indicator fluid. It is subject to immersion in a body of liquid, the change in level of which is to be measured. It includes an improvement which eliminates the formation of a capillary seal at the top of the open leg. The improvement uses a relatively thin wire that is supported so as to extend down into the open leg far enough to reach through the capillary seal.

4 Claims, 4 Drawing Figures

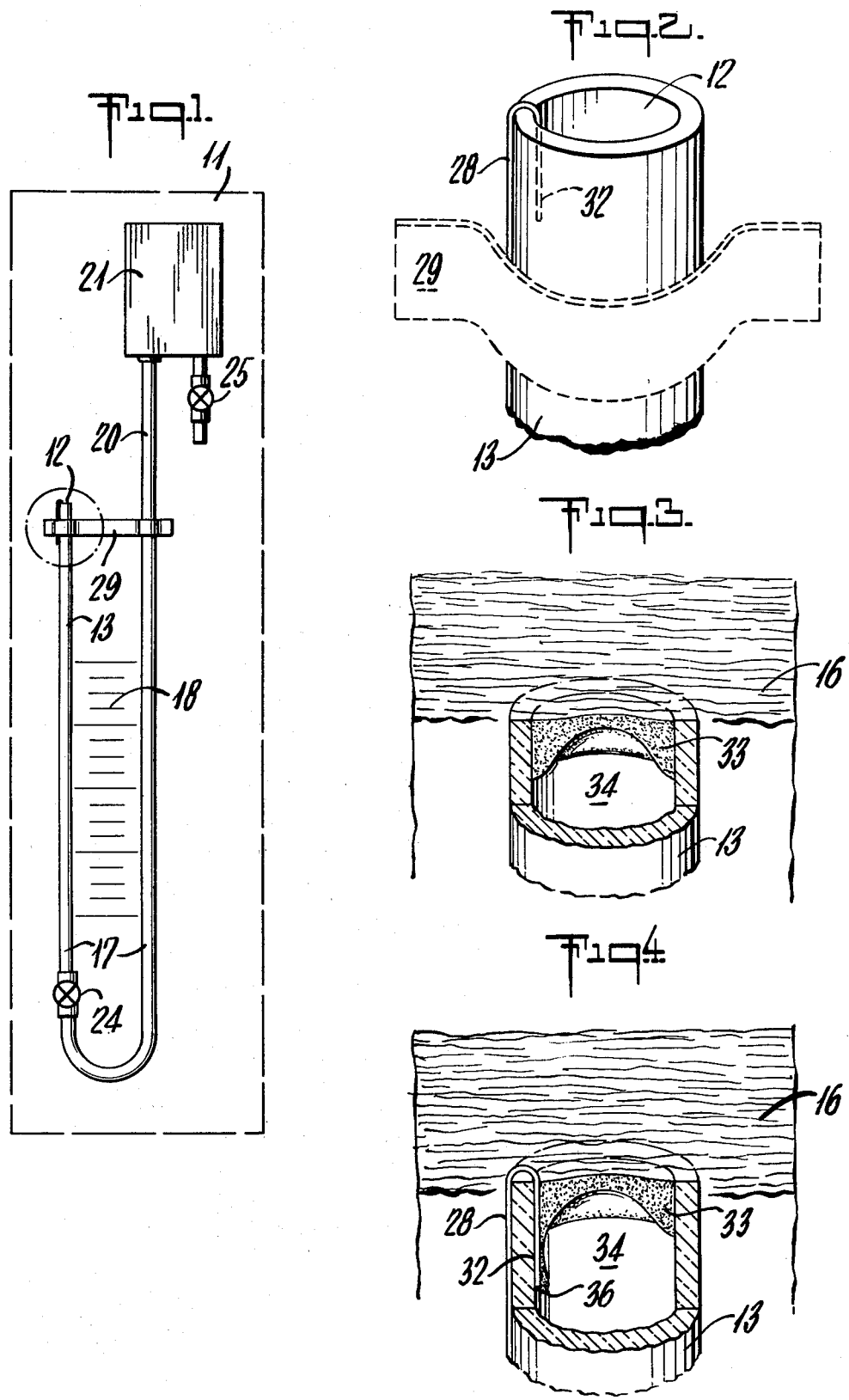

MANOMETER TYPE APPARATUS WITH IMPROVEMENT

BACKGROUND OF THE INVENTION

1. Field of the Invention

This invention concerns an improvement related to an underground tank leak detector instrument. More particularly, the instrument deals with measuring the level of liquid in an underground tank. And, it employs some aspects of a manometer for measuring the change in liquid level.

2. Description of the Prior Art

An instrument has been developed for measuring a change in surface level of a liquid, and the adaptation of that instrument to underground tank leak detection of petroleum products has been quite successful in connection with underground tanks holding gasoline. However, when attempts were made to make use of that instrument for the same measurements where the product in the tank was diesel fuel, a problem was encountered in connection with the open end of a leg of the manometer portion. An embodiment of the foregoing instrument is shown and described in an article published in the "Petroleum Marketer," September-October 1978 issue, Volume 46, No. 5. That published article clearly illustrates a form of structure to which this invention applies.

Thus, it is an object of this invention to provide apparatus for overcoming a difficulty which causes failure in the operation of an instrument which includes a manometer or the like, containing an indicator fluid in a U-tube with one leg open and subject to being immersed in a liquid being measured.

SUMMARY OF THE INVENTION

Briefly, the invention concerns a manometer or the like wherein indicator fluid is contained in a U-tube, one leg of which is open and subject to being immersed in a body of liquid for measuring change in the level of the liquid. It concerns the improvement which comprises means for breaking a capillary seal of said liquid at said open leg when said immersion takes place.

Again briefly, the invention relates to a sensitive J-tube instrument for measuring change in the surface level of a fluid in an underground tank or the like, the said instrument having a U-tube portion containing indicator fluid therein with the shorter leg of said J-tube being open and subject to being immersed in said underground tank fluid. It concerns the improvement which comprises means for avoiding the formation of a capillary seal when said open leg is immersed in said underground tank fluid. The said means comprises a relatively small diameter wire, and means for attaching said wire adjacent to the top of said open leg on the outside thereof. The said wire is draped over to lie along the inside surface of said open leg and extend down far enough to reach through said capillary seal.

BRIEF DESCRIPTION OF THE DRAWINGS

The foregoing and other objects and benefits of the invention will be more fully set forth below in connection with the best mode contemplated by the inventors of carrying out the invention, and in connection with which there are illustrations provided in the drawings, wherein:

FIG. 1 is a schematic illustration showing an instrument with the improvement according to the invention applied to an open leg of a manometer portion;

FIG. 2 is an enlarged perspective illustrating the wire and its application to the open end of the manometer leg;

FIG. 3 is an enlarged schematic illustrating the formation of a capillary seal at the open end of the manometer leg; and FIG. 4 is an enlarged schematic elevation partly broken away in cross section illustrating the action of a wire according to the invention in breaking the capillary seal which was indicated in FIG. 3.

DESCRIPTION OF THE PREFERRED EMBODIMENT

An instrument in accordance with the principles described in U.S. Pat. No. 4,182,178 has been developed and it has taken the form illustrated and described in the aforementioned article published in "Petroleum Marketer." However, when use of the instrument was attempted in connection with diesel fuel instead of gasoline, it was discovered that a capillary seal tended to form at the top of the open leg of the manometer section of the instrument. And, that seal would, of course, cause the instrument to be inoperative. In order to overcome that problem, an improvement has been developed which is applicable to the open end of a tube constituting one leg of a manometer.

An instrument 11 is schematically illustrated within dashed lines in FIG. 1. The operation of the instrument in connection with measuring changes in liquid level is not directly relevant to this invention and, consequently, need not be further described. However, it will be understood that use of the instrument involves its being immersed in the liquid being measured. Consequently, an open end 12 of a leg 13 of the instrument 11, will be immersed so that it goes below the surface of a body of liquid 16 which is illustrated in FIGS. 3 and 4.

The instrument 11 has a U-tube portion 17 at the bottom. And it contains an indicator fluid (not shown) therein. The indicator fluid is not miscible with the body of liquid 16 which is being measured, and when the manometer, i.e. U-tube portion 17, is subjected to equilibrium conditions, the indicator fluid level will be at the same height in both legs which may be observed in relation to index marks or lines 18. The instrument also has a longer leg 20 which makes up the J-tube and the leg 20 is connected into a larger diameter reservoir 21.

While it is not directly relevant to this invention, it may be noted that the instrument 11 operates by having an indicator fluid (as indicated above) in the U-tube portion 17, which indicator fluid is immiscible with the liquid 16 that is to be measured. Then, as explained in the article mentioned above, there are two valves 24 and 25 located in one leg of the U-tube portion 17 and an entry to the reservoir 21, respectively. These valves are provided so that after immersing the instrument 11 into the liquid 16 until it is beneath the surface thereof while the valves 24 and 25 are open, the indicator fluid (not shown) in the U-tube portion 17 will be at equal levels in the U-tube. This is known as priming the instrument, and the depth of immersion of the instrument 11 will be such that the level of the surface of liquid 16 is at somewhere near the vertical midpoint of the reservoir 21. Next, the valve 25 will be closed while the valve 24 will remain open and the start of a measurement time period will commence. If the liquid level of liquid 16 changes, the difference in level will create a difference from the level of the liquid retained in the reservoir 21 and this will be magnified in the manometer indication at the indicating fluid in the U-tube portion 17. Thereafter, in order to read the magnified change, the valve 24 will be closed in order to hold conditions as they were while the instrument 11 is raised to the surface for observation and reading.

It has been discovered that during the operation just described, the immersion of the instrument 11 in the liquid 16 may result in a capillary seal at the open end 12 of the leg 13. That, of course, renders the instrument inoperative.

In order to overcome that problem, this invention involves the improvement resulting from the use of a small diameter wire 28 that is attached to the open leg 13 of the instrument 11 near the open top 12. The attachment is made by any feasible means, e.g. by having a clamp strap 29 go over the leg 13 with the wire 28 underneath. An end 32 of the wire 28 is draped over the top edge of the leg 13 and extends down along the inside surface far enough to reach through any capillary seal. For example, a seal 33 that is illustrated in FIGS. 3 and 4 tends to form over a vapor space 34.

The action which breaks the seal 33 is illustrated in FIG. 4 where it will be observed that the end 32 of the wire 28 is in contact with the liquid 16 including that forming the seal 33. This permits the liquid with the seal 33 to adhere to its surface and run down by gravity force to follow the end 33 of the wire into the space 34. That makes a path for filling the space 34 with the liquid 16 including the rest of the leg 13 of the instrument 11 above the indicator fluid in the U-tube portion 17. It may be noted that the seal breaking action is illustrated by showing a drop 36 forming at the bottom of the end 32 of the wire.

It has been found that this improvement does not hinder the detector's use in connection with gasoline or similar liquids. Thus, it makes the versatility of the instrument greater for extending the range of liquids which may be measured.

While a particular embodiment of the invention has been described above in considerable detail in accordance with the applicable statutes, this is not to be taken as in any way limiting the invention but merely as being descriptive thereof.

We claim:

1. In a manometer or the like wherein an indicator fluid is contained in a U-tube partially filling both legs thereof under equilibrium conditions, said U-tube having one leg open at the top, said leg being subject to formation of a capillary seal when immersed in a body of liquid for measuring change in the level of said liquid, the improvement comprising means for breaking said capillary seal comprising a wire extending into said open leg far enough to reach through said capillary seal.

2. In a manometer according to claim 1, wherein said wire lies along the inside surface of said open leg.

3. In a manometer according to claim 2, wherein said wire is attached outside and draped over the top edge of said open leg.

4. In a sensitive J-tube instrument for measuring change in the surface level of a fluid in an underground tank or the like, said instrument having a U-tube portion containing indicator fluid therein with the shorter leg of said J-tube being open and subject to being immersed in said underground tank fluid, the improvement comprising means for avoiding the formation of a capillary seal when said open leg is immersed in said underground tank fluid, comprising a relatively small diameter wire, means for attaching said wire adjacent to the top of said open leg on the outside thereof, said wire being draped over to lie along the inside surface of said open leg and extending down far enough to reach through said capillary seal.

* * * * *